Figure 1:
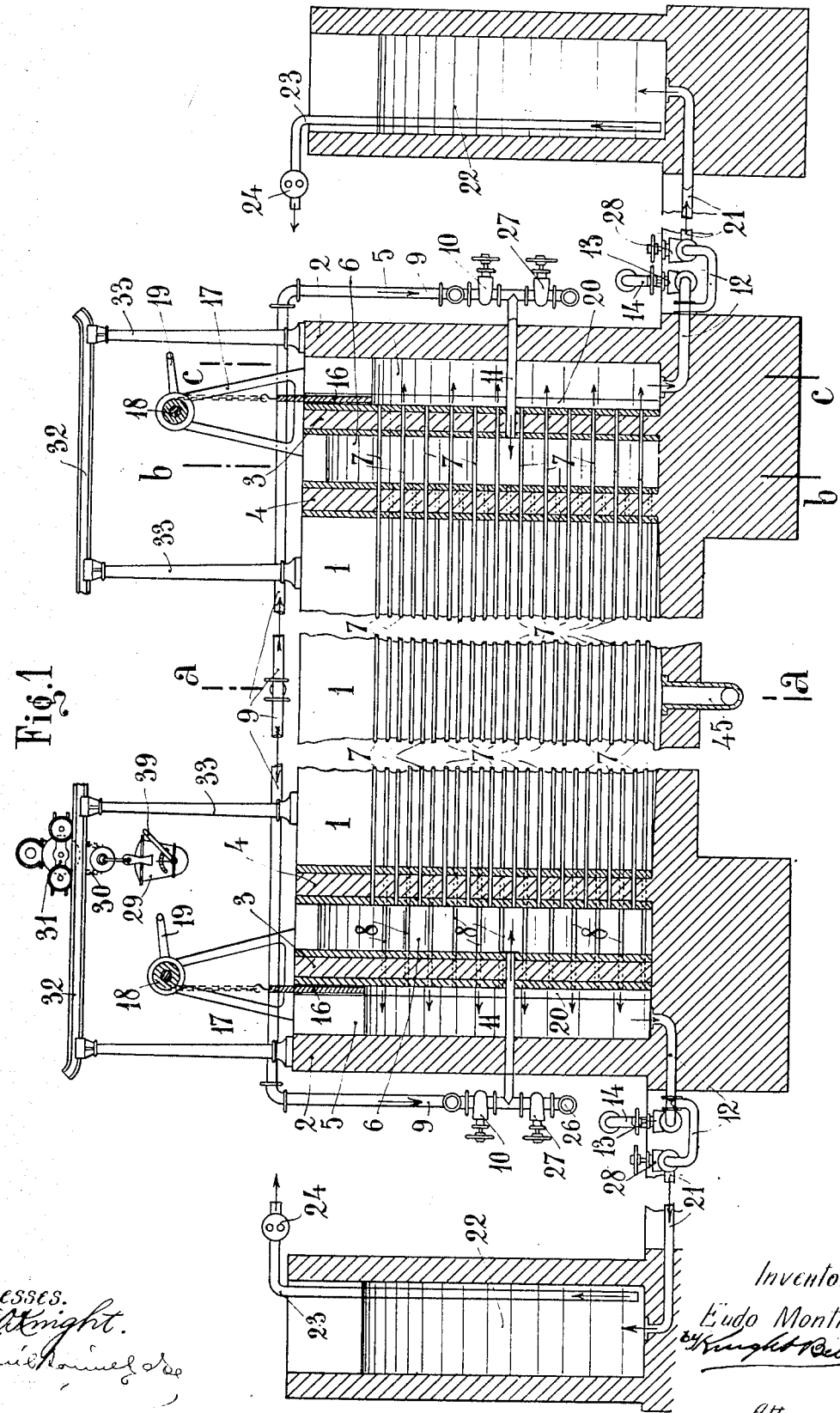

E. MONTI.
APPARATUS FOR CONCENTRATING SOLUTIONS BY FREEZING.
APPLICATION FILED MAR. 20, 1907.

925,820.

Patented June 22, 1909.

6 SHEETS—SHEET 1.

Witnesses.
Inventor:
Eudo Monti.
Attorneys

E. MONTI.
APPARATUS FOR CONCENTRATING SOLUTIONS BY FREEZING.
APPLICATION FILED MAR. 20, 1907.
925,820.
Patented June 22, 1909.
6 SHEETS—SHEET 2.
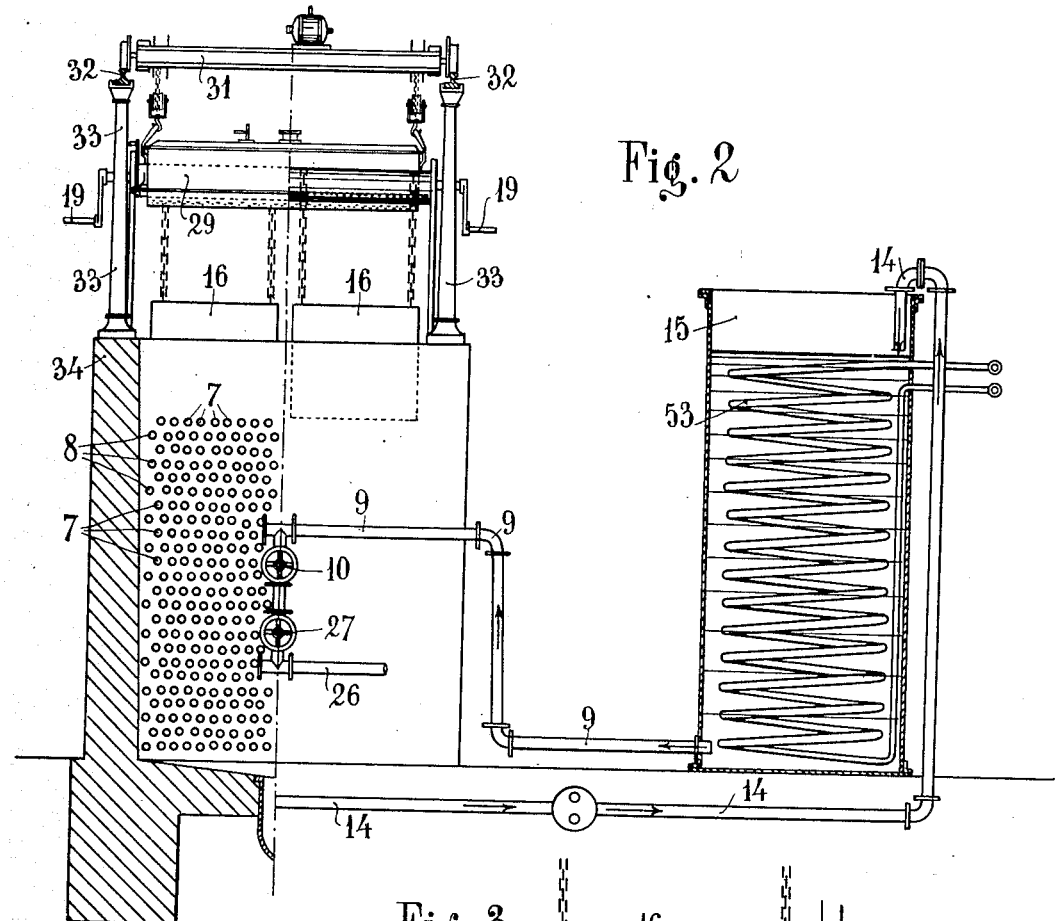
Fig. 2
Fig. 3
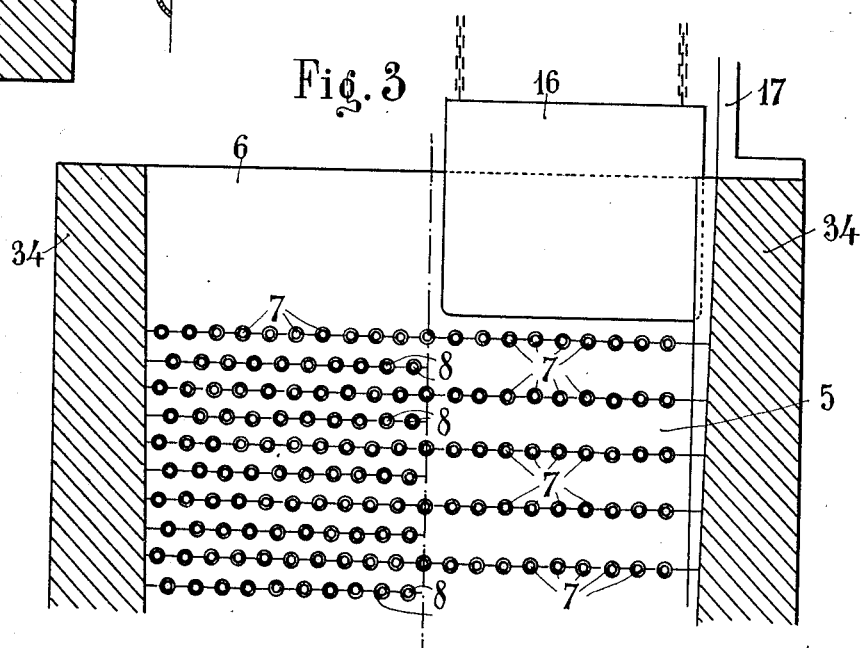
Witnesses.
Inventor.
Eudo Monti.
by Knight Bros
Attorneys

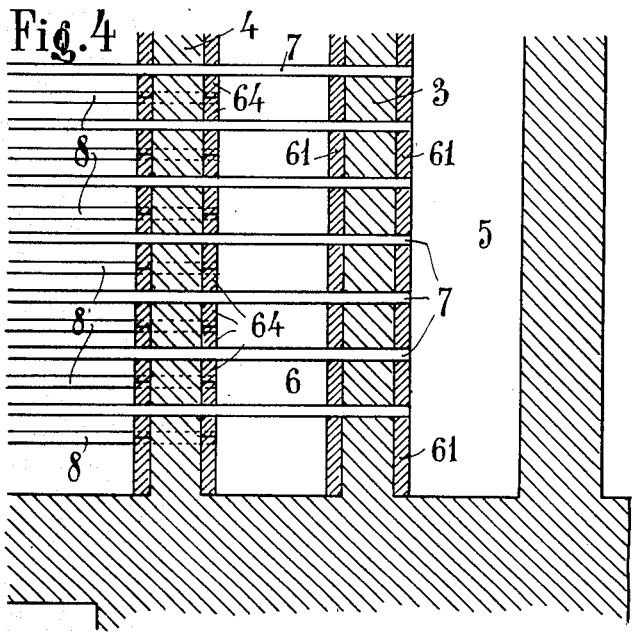
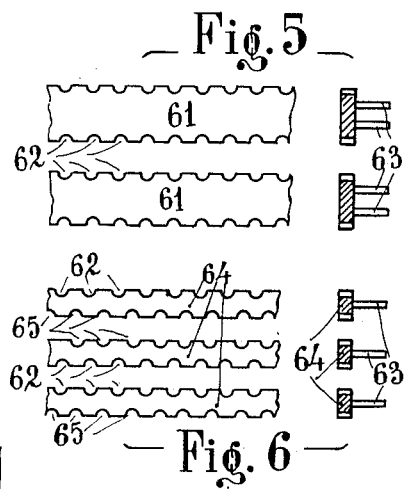
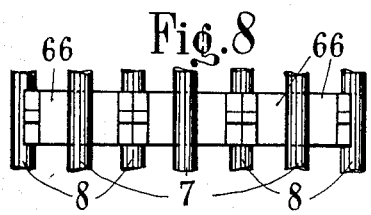
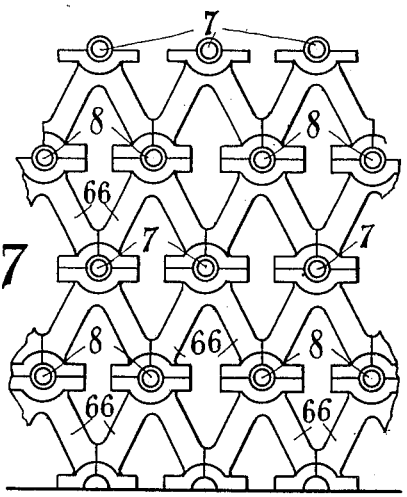
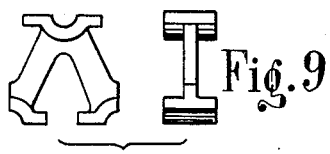
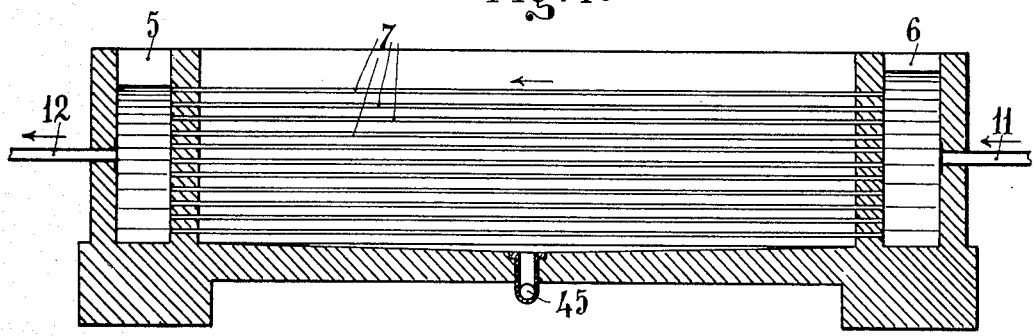

E. MONTI.
APPARATUS FOR CONCENTRATING SOLUTIONS BY FREEZING.
APPLICATION FILED MAR. 20, 1907.
925,820.
Patented June 22, 1909.
6 SHEETS—SHEET 4.
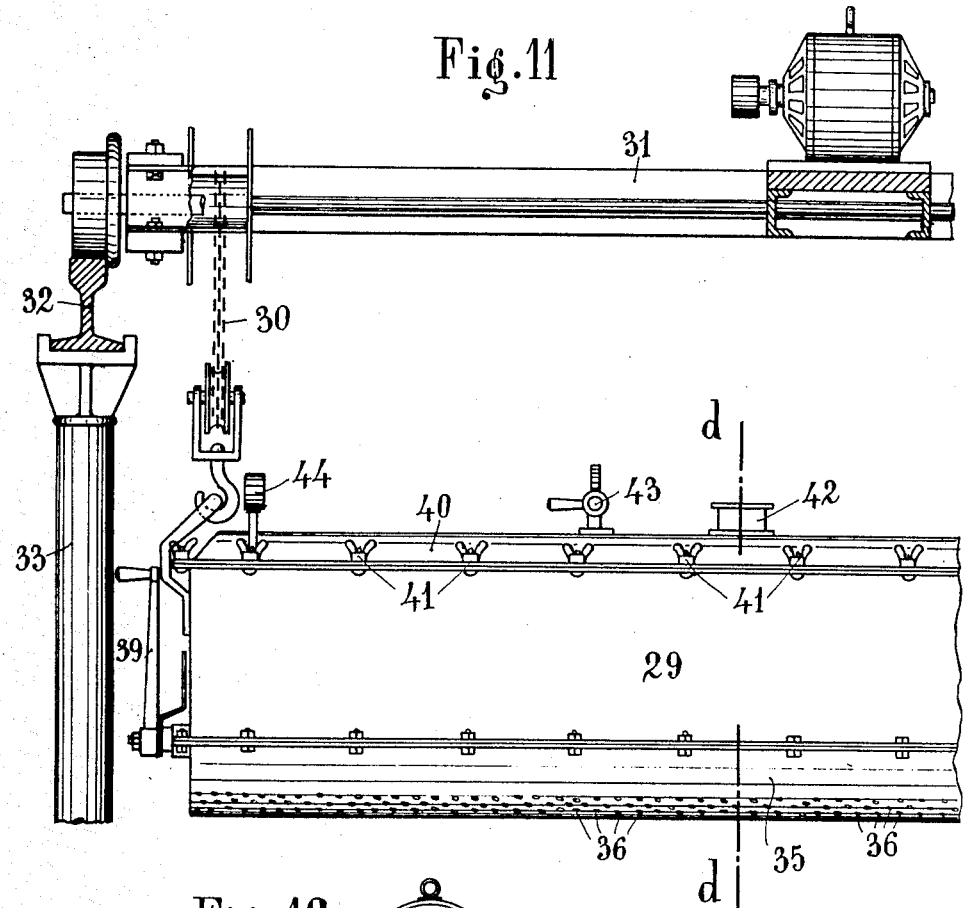
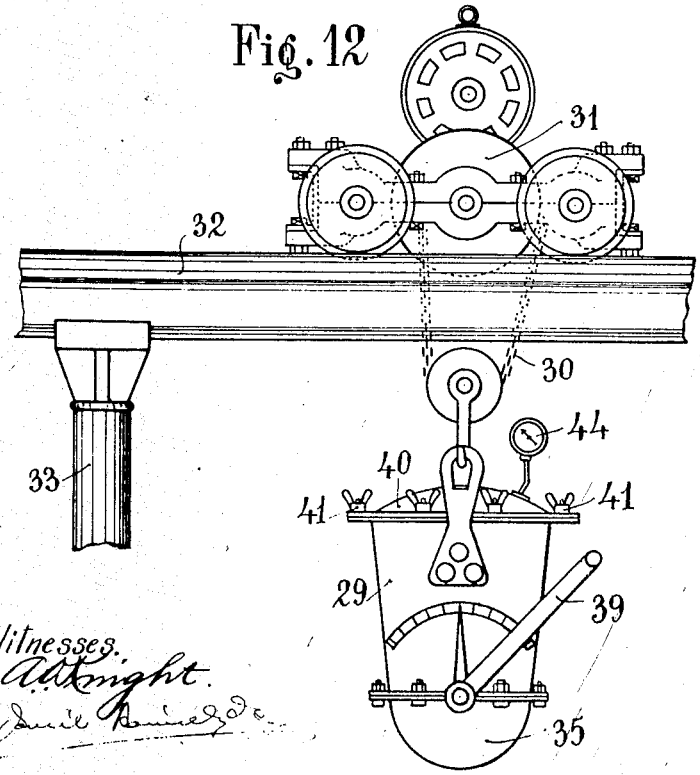
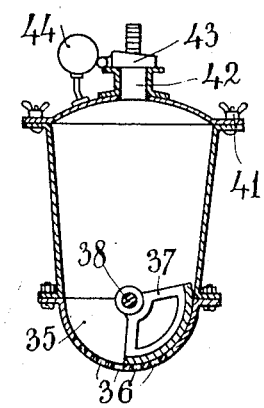
Witnesses.
Inventor:
Eudo Monti.

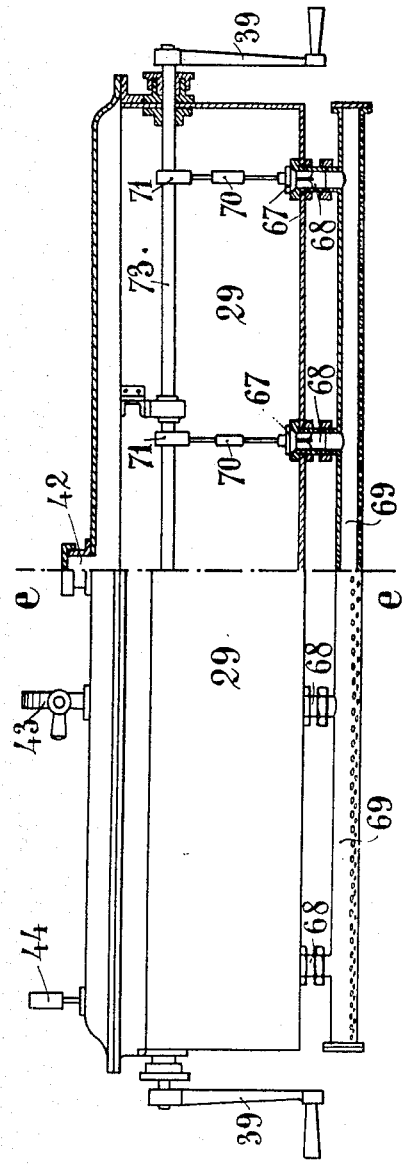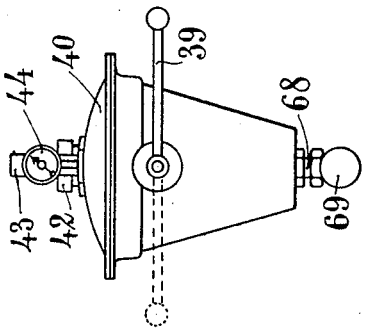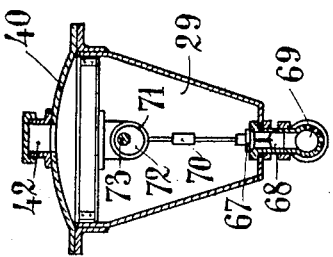

E. MONTI.
APPARATUS FOR CONCENTRATING SOLUTIONS BY FREEZING.
APPLICATION FILED MAR. 20, 1907.

925,820.

Patented June 22, 1909.
6 SHEETS—SHEET 6.

UNITED STATES PATENT OFFICE.

EUDO MONTI, OF TURIN, ITALY.

APPARATUS FOR CONCENTRATING SOLUTIONS BY FREEZING.

No. 925,820.    Specification of Letters Patent.    Patented June 22, 1909.

Application filed March 20, 1907. Serial No. 363,527.

*To all whom it may concern:*

Be it known that I, EUDO MONTI, a subject of the King of Italy, and resident of Turin, Italy, have invented certain new and useful improvements in apparatus for concentrating solutions by freezing and systematically displacing the soluble substances from the ice crystals, of which the following is a specification.

The present invention relates to improvements in the apparatus for carrying on the process of concentrating solutions by freezing protected by my American Patent No. 761387 dated May 31st 1904 and patent applications Ser. Nos. 223919, 223920 filed September 9th 1904, Ser. No. 285936 filed November 4th 1905, and especially of the apparatus in which the freezing of the solution to be concentrated is operated by means of cooled brine, which is caused to circulate in pipes plunged in the solution to be concentrated.

These improvements consist in the peculiar construction of the freezing tanks to be used for the concentration of large quantities of liquids, which tanks being square may be constructed of a very large size using armored or reinforced concrete, wood or any other suitable material.

These improvements consist further in the use of straight steel or other suitable pipes varnished or coated with tar, by means of which a large interchanging surface may be obtained much cheaper than by using the usual coils.

Another aim of the present invention is to provide an apparatus, by which it is possible to effect readily and evenly, while the displacement is going on, a spraying of the frozen mass with the more and more diluted displacing solutions obtained in a former operation and to cause the displacement to take place eventually in an atmosphere of an inert gas heavier than the air.

The present improvements consist further in reducing the number of cocks, that may be substituted with sliding valves or partitions and in the general arrangement of the apparatus in such a way as to fully utilize the heat absorbed by the melting of the ice, separated in previous operations, for the further cooling of the gas already liquefied coming from the condenser.

These improvements relate further to a special arrangement of the apparatus, by which the brine is caused to circulate alternately in the freezing pipes at the ordinary temperature for the purpose of melting the layer of hard ice which often adheres to said tubes.

Another aim is to provide an arrangement whereby to utilize the heat absorbed by the lukewarm brine circulating in the freezing pipes for the further cooling of the liquefied gas or of the solution to be frozen; thus allowing the use of the same quantity of brine for softening the impermeable ice adhering to the tubes, in an unlimited number of operations, the result being to considerably diminish both the cost of the plant and the running expenses.

In the annexed drawings are shown some constructional forms of the apparatus and a complete plant of a battery of freezing tanks.

Figure 17:
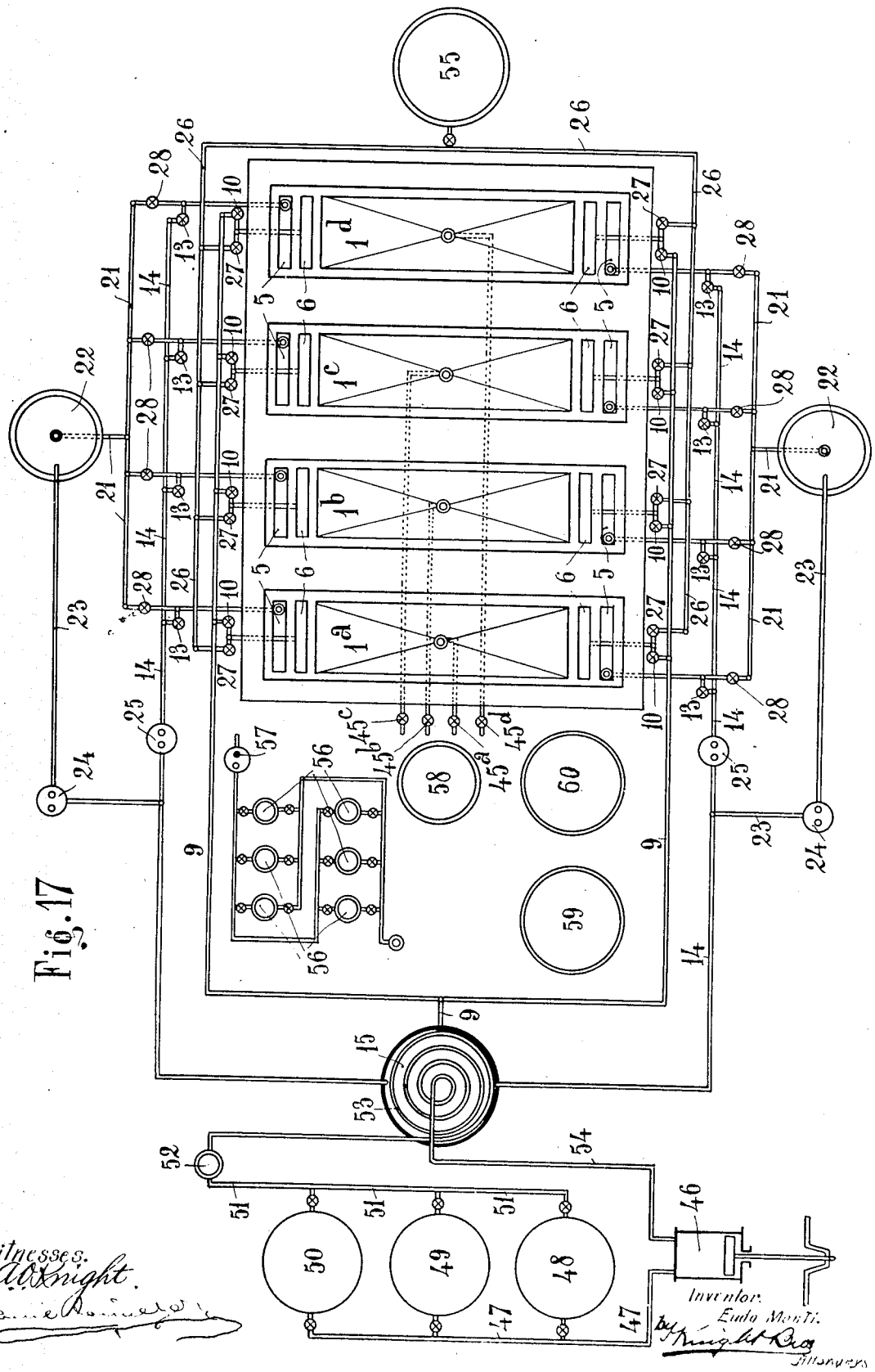

Figure 1 is a sectional longitudinal view of a freezing tank. Fig. 2, on the left half, is a vertical cross section of said freezing tank on line —a. a— of Fig. 1 and, on the right half, an end view of said freezing tank with the refrigerator of the ice machine. Fig. 3 is a combination view on an enlarged scale, comprising, on the left half, the vertical cross section of the upper part of said tank on line —b. b— of Fig. 1 and, on the right half, a similar section on line —c. c of Fig. 1. Fig. 4 shows in vertical longitudinal section, a detail of the top compartments of a tank, in which terminate the tubes in which the cooled brine circulates; Figs. 5 and 6 are respectively a side view and a cross section of the armor plates used in connection with the partitions in the top compartments of the tank. Fig. 7 is an end view of a portion of the tube holders in the tanks. Fig. 8 is a plan view of same and Fig. 9 an end and side view of one of said holders. Fig. 10 is a longitudinal section of a modified form of a freezing tank. Fig. 11 is a front view of the traveling crane and of the spraying reservoir parts being shown in section. Fig. 12 is a side view of same. Fig. 13 is a cross section of the spraying reservoir on line —d. d— of Fig. 11. Fig. 14 is a view of a modified form of the spraying reservoir, comprising in one-half thereof, a side elevation, and in the other half, a longitudinal section. Fig. 15 is a cross section of same on line —e. e— of Fig. 14. Fig. 16 is an end view of same. Fig. 17 is a diagrammatic plan view of a series of four freezing tanks alternately cooled by a single ice machine.

The freezing tank —1— (Fig. 1) may be built of reinforced concrete, wood or other suitable material and is provided at its ends, besides the outer walls —2—, with two inner walls —3. 4— forming thus at each end of the tank —1—, the two compartments —5. 6—. Straight metallic tubes —7. 8— generally made of steel varnished or coated with tar, but which may of course be made of any other material to suit the characters of the solution to be concentrated, are arranged longitudinally in the tank —1— in as many horizontal ranges as accords to the height of the tank or basin. The ranges of the tubes —7— go from the left feeding compartment —6— (Fig. 1) to the right collecting compartment —5— and vice versa the ranges of the tubes —8— go from the feeding compartment —6— on the right to the collector compartment —5— on the left side. Moreover the series of pipes —8— and —7— are disposed in quincunx as shown at Fig. 2. Through pipes —7— and —8— flows in opposite directions the cool brine coming from the refrigerator —15— of the ice machine and passing through the pipes —9— valves —10— and pipes —11—, these latter crossing the walls —2. 3— and ending in the compartments —6—. It is obvious that said brine will then pass from the left feeding compartment —6— through pipes —7— to the collector —5— on the right side and from the right feeding compartment —6— through pipes —8— to the collector —5— on the left side. In this way all the brine reaches the collectors —5— passing through freezing pipes —7— and —8— is discharged by the tubes —12— and goes again through valve —13— and tubes —14— to the refrigerator —15— of the freezing machine. This circulation is obtained by means of the pumps —25— (only one is visible in Fig. 2) inserted on the tubes —14— and will cause the level of the brine in the compartment —5— to sink; it follows that the circulation of the brine is controlled by the pumps —25— and may be stopped or slackened by stopping or reducing the speed of said pumps. Owing to the uniform arrangement of the tubes —7. 8— and moreover to the fact that the flow of cooled brine in the pipes —7. 8— has an inverted direction, an even cooling and therefore an even freezing of the solution to be concentrated is obtained.

A simpler arrangement of the freezing tubes is shown in Fig. 10, which same gives useful results provided that the circulation of the brine in the tubes be very quick. This condition involves a greater use of energy, which is however compensated by a cheaper instalment. In this constructional form there is a single feeding compartment —6— on the right side fed by the admission tube —11—, from said compartment —6— the cooled brine passes through the tubes —7— into the discharging compartment —5—, from which it is discharged through the outlet tube —12—. Evidently in this simpler form of construction the direction of the brine circulation in all the freezing pipes is the same and in order to obtain an even congelation it is necessary that the temperature of the feeding and waste brine be but slightly different. An even congelation of the solution may of course be obtained also by causing the refrigerated brine to circulate in turns in opposite directions through pipes —7—. This mode of operation may be obtained in the embodiment shown in Fig. 10 by connecting the feeding and collecting compartment alternately with the brine pump by means of flexible pipes and opening or shutting accordingly the cocks or partitions controlling the overflow pipes of said compartments or in any other suitable way.

The pipes —11— (Figs. 1, 2) may be caused to communicate with the pipes —26— by opening the valves —27—. From said pipes comes the lukewarm brine, which may thus be drawn in the pipes —7 and 8— instead of the cooled brine when the circulation of this latter has been stopped by closing the valves —10—, and the feeding and waste reservoirs —6— and —5— emptied for the purpose hereinafter explained. In the same manner the outlet pipes —12— may be connected, by opening the valves —28—, with the pipes —21— leading the brine into the tanks —22—, from which by means of the tubes —23— and pumps —24—, it may be sent to an interchanger or condenser or anywhere else, in the way and for the purpose hereafter set forth.

The circulation of the cooled brine in the different ranges of tubes may be controlled by means of the sliding partition —16— running along the surface of the walls —3— of the feeding compartment —5—. The sliding partitions —16— are suspended by means of chains —17— to the winch drums —18— operated by the cranks —19— and slide in the vertical grooves —20— running along the walls —3—. Consequently, by lowering the partitions —16—, the circulation is checked in a certain number of tubes —7. 8—, either at the upper central part or at the lower one according to the height at which the partitions —16— are arranged. This obstruction of a certain number of freezing pipes —7. 8— causes the circulation of the brine in said pipes to slacken and even to stop, thus hindering the cooling of the corresponding layers of solution. It is however easy when the solution to be concentrated is heavier than the water to control the freezing of the different layers of solution in the tank in such a way as to enrich the lower layers before freezing them, as it has been described and claimed in my U. S. patent application No. 285936.

The Figs. 3, 4, 5, 6 show on an enlarged scale the details of construction of the walls —3. 4— supporting the pipe heads. The wall —3—, which is crossed by one half only of the pipes —7. 8— is made of wooden planks cast iron or properly shaped brick or artificial stone side plates —61— (see Fig. 5 in detail) provided with suitable notches —62— for holding the tubes —7— and pins —63— connecting them with the concrete or tar forming the inner part of the wall. These plates are arranged at both sides of the wall —3— while the pipes —7— and —8— are being placed; soft concrete, cement, tar or asphalt is then poured between the plates and hardening there, forms a water tight closure. The wall —4— is constructed in the same way, but the side plates —64— (Fig. 6) are cast in such a way as to allow both ranges of pipes to pass through; said plates are therefore provided with a double number of notches —62— for the tubes —7— and —65— for the tubes —8—; they are also provided with pins —63— for securing them to the concrete or tar mass constituting the wall —4—.

In order to support the freezing pipes —7. 8— inside the tank —1—, thus preventing any alteration in the respective distance which would affect the uniformity of the freezing, I employ the detachable holders shown in front view in Fig. 7 and in plan view in Fig. 8, while Fig. 9 shows, in front and side view, a separated element —66 of said holders, which need no further description inasmuch as they are not of my invention and might evidently be substituted by any other suitable form allowing a quick removal of the pipes when repairs are necessary.

When the freezing in tank —1— is completed, the displacement is carried on as described in my U. S. Patent No. 761387 dated May 31st 1904, that is to say by spraying the frozen mass with more and more diluted solutions obtained in previous operations. In order to obtain an even spraying of the frozen mass, I employ the spraying apparatus shown in Figs. 11, 12, 13. Said apparatus is supported by means of chains —30— by an overhead traveling crane —31— operated by means of an electric motor or in any other suitable way, sliding on beams —32— supported by the pillars —33— arranged on the side walls —34— of the tank —1— (Figs. 1, 2). The lower part —35— of the tank —29— is cylindrical and provided with holes —36—. A sliding plate fitting exactly on the inner surface of the bottom —35—, is supported by the shaft —38— crossing the reservoir's walls —29— by means of water tight bearings and is worked from the outside by means of the crank —39—. It appears clearly from Fig. 13 that by suitably turning the sliding stopper —37— by means of the crank —39— it is possible either to shut completely the holes —36—, or to leave open more or less of them, thus enabling the operator to regulate the quantity of solution dripping from the reservoir —29—. This latter is provided with an air tight cover —40— secured thereto by means of the bolts —41—, the same being applied when it is desired to sprinkle the displacing solution under gas pressure. Said cover is provided with an inlet —42—, a cock —43— and a manometer —44—. In order to effect in this case the sprinkling under pressure of dry carbonic acid or any other suitable gas, after having filled the reservoir —29— with the solution—operation which may also be effected under pressure of dry carbonic acid—, I connect cock —43— with the outlet tube of a cylinder containing the compressed dry carbonic acid; in this way I cause the liquid contained in —29— to sprinkle out in a finely and evenly divided shower. The quantity of sprinkled liquid is evidently proportioned to the pressure in —29— and to the number and diameter of the openings —36— left free by the stopper —37—. By moving the sprinkler —26— to-and-fro above the frozen mass contained in the tank —1— by means of the traveling crane —31—, the underlying mass of ice crystals will be sprinkled evenly thus insuring a complete and even displacement of the weak solutions. When it is desired to effect the displacement out of contact with the air, the frozen solution may be covered with a layer of dry carbonic acid or other inert or reducing gas heavier than the air, which is easily held by the walls of the tank —1—; the same being for said purpose raised above the level of the frozen mass. The sprinkling reservoir —29— is then lowered enough to be plunged into the layer of inert gas, thus effecting the displacement out of contact with the air.

A modified form of the spraying apparatus is illustrated in Figs. 14, 15, 16. For varying the quantity of liquid coming out of the reservoir, I employ here instead of the stopper —37— and cylindrical bored bottom —35—, valves —67— controlling the liquid admission in the short sleeves —68— connecting the reservoir —29— with the perforated tube —69—. The valves —67— are provided with stems —70— secured to the clip —71— of eccentrics —72— mounted on the shaft —73— coming out of the reservoir —29— and controlled by means of cranks —39—. It is evident that by turning the shaft —73—, the valves —67— are raised more or less or fully closed on their seats arranged at the top of the sleeves —68—; so that in the position of the crank —39— shown in full lines in Fig. 16, the valves are quite closed, in the position shown in dotted lines, they are wide opened. It is thus possible to control the quantity of liquid coming out of the reservoir —29—. It is obvious that any other form of sprinkling apparatus may be employed provided it suits the purpose of spraying the liquid evenly on the surface of the frozen mass.

The solutions drawn from the frozen mass by the displacing process are collected at the bottom of the tank —1—, which slopes toward the tube —45— in which flow successively the concentrated solutions and the diluted solutions dripping afterward from the frozen mass and lastly the water of the melting ice left in the tank.

The concentrating plant illustrated in Fig. 17 will now be described. The same includes four freezing tanks —1$^a$, 1$^b$, 1$^c$, 1$^d$—; —15— is the refrigerator of the ice machine connected with one or more of the three condensers —48, 49, 50—, which may be employed together or separately, by connecting them in tandem series. The condensation of the compressed gas is obtained by the circulation of cooling water in the condenser —48—; in condenser or rather interchanger —47— water at 0° which has been used for melting the ice in the freezing tanks is caused to circulate and in —50— the liquefied gas may be cooled by inverted circulation of brine, which has been used to soften the hard ice coating the freezing pipes. The liquefied and cooled gas coming from the condenser or interchangers arrives through the tube —51— at the expansion valve and goes from thence to the evaporator and through the suction pipe —54— back to the compressor —46—.

The cooled brine is drawn from the refrigerator —15— through the piping —9— and valves —10— into the feeding compartments —6— of said tanks, passes through the freezing pipes —7— and —8— into the collectors —5— and through waste pipe —12— and valve —13— into return pipe —14— which conveys it back to the refrigerator —15—. The brine circulation is controlled by the difference of level between the feeding and waste reservoirs caused by the action of pumps —25— connected in circuit with pipe —14—. It is obvious that by turning the cocks or valves 10, 13 it is possible to put one or more of the tanks out of circuit. In the same way each tank of the series may be put in communication with the collecting reservoirs —22— by means of the cocks —28— and tubes —21—. Brine from the reservoir 55 at a relatively high temperature, may be caused to circulate through the freezing pipes 7, and 8 of each tank, by closing cocks 10 and opening cocks 27. The concentrated solutions drawn from the tanks —1$^a$— to —1$^d$— during the displacement and which are discharged by the tubes 45$^a$— 45$^d$ are led to one or more suitable reservoirs not shown in the drawing. The more and more diluted solutions are afterward conveyed into the barrels —56—, from which they may be drawn by means of the pump —57— in order to use them to displace the concentrated solution from the ice crystals in a following operation.

—58— is the reservoir for the icy water obtained by melting the ice left in the tanks after the displacement is over. The melting of the ice must be operated by spraying the ice contained in the tank with a quantity of cooling water. This is strictly necessary in order to obtain the largest possible quantity of water cooled to a temperature as near as possible 0°. Said icy water may be drawn from the well —58— and conveyed either into the condensers or interchangers —49— or in other interchangers —59, 60—, in which it may be used for systematically cooling either the solutions to be concentrated or the displacing solutions before effecting the displacement. The number of the freezing tanks connected to form a battery may of course be reduced to two if the freezing process in one of said tanks is carried on so slowly as to allow the operator time to draw the concentrated solution, to soften the hard ice coating the freezing pipes, to operate the displacement, the melting of the separated and depurated ice and to fill the tank with a new quantity of solution to be concentrated while the freezing in the other tank is going on.

The following demonstration shows that by means of the above described set of apparatus, the process of concentration may be carried on in a continuous way. In fact while the freezing is going on in tank —1$^a$—, the concentrated solution is caused to drip from the ice crystals filling the tank —1$^b$— and contemporaneously I operate the displacement in tank —1$^c$—, while I pour cooling water on tank —1$^d$—, in order to melt the ice left after the displacement is over. I draw the refrigerated water into the well —58— and fill again said tank —1$^d$— with a new charge of solution to be frozen after the freezing in tank —1$^a$— is completed. Being assumed that tank —1$^a$— is being frozen, tank —1$^b$— has already been frozen and the concentrated solution is dripping from the ice, in tank —1$^c$— the displacement is going on, in tank —1$^d$— the clear ice has been melted by a suitable quantity of cooling water, the water has been drawn and the tank is ready to be filled with a new charge of solution. After the tank —1$^d$— has been filled with a new charge of solution, the cocks 10, 13 must be opened so that the cooled brine coming from the refrigerator —15— of the ice machine be allowed to circulate in the tubes —7, 8— of the said tank.

The tank —1$^b$—, in which the freezing is achieved, the solution having been cooled to a temperature corresponding to the desired concentration, is cut out of the cold brine circulation by closing the cocks —10, 13—, and as the cooling pipes and the feeding and waste reservoirs —5— and —6— still contain a considerable quantity of cooled brine, which prevent the melting of the ice sticking to the freezing pipes, I operate as follows: 1. I open the discharging pipe —45ᵇ— and allow the portion of concentrated solution not held by capillarity to drip. I discharge then from the freezing pipes —7. 8— and from the compartments —5. 6— the cold brine by opening the cocks —28— corresponding to said tank —1ᵇ—. Said brine passes into the reservoir —22—, from which by means of the pumps —24— and through the tubes —23— returns through the tubes —14— to the refrigerator of the machine. When the cold brine filling the tubes and the compartments of the tank —1ᵇ— has been drawn, the cocks —27— are opened: thus the solution at the ordinary temperature coming from the cistern —55— through the tubes —26— passes into the battery of tubes of the tank —1ᵇ— and reaches cooled the tanks —22— from which it may be conveyed into the interchangers —48. 49—. The flow of a certain quantity of comparatively warm brine in the freezing pipes of —1ᵇ— is necessary before starting the displacement in order to soften the layer of compact ice adhering to the freezing pipes formed while the concentrated solution is dripping from the ice, this layer being almost impermeable would hinder the displacement of the interposed soluble matters. By the flowing of this solution at the outer temperature, I obtain both the advantage of facilitating the further displacement and of making use of the heat absorbed by the melting of the compact ice coating the freezing pipes —7. 8— of the tanks —1ᵇ— in order to cool said brine from the original temperature to about 0° C., the brine thus cooled being used to cool other liquid or gases in an interchanger or in the condenser. After the layer of compact ice coating the tubes —7. 8— of —bⁱ— appears to be softened the displacement is carried on as described in my prior patents, by pumping the displacing solutions from the reservoirs —56— by means of the pump —57— and conveying them into the reservoir —29— suspended at the overhead traveling crane. Owing to the form of said reservoir —29— and the to-and-fro motion imparted by the traveling crane as above described, it is possible to obtain an even spraying of the frozen mass and therefore an even and complete displacement. The concentrated solutions thus obtained and flowing from the cocks —45ᵇ— are conveyed to suitable reservoirs not shown in the drawings, while the more and more diluted solutions are conveyed to the reservoirs —56— to serve as displacing solutions in a subsequent operation. After these operations are over, there remain in the tank —1ᵇ— a mass of nearly pure ice. This tank is exactly in the condition in which it has been assumed the tank —1ᶜ— was and is therefore ready for starting a new operation. In order to melt the ice contained in the tank —1ᶜ— I add the necessary quantity of cooling water at the lowest possible temperature in order to obtain the greatest quantity of water cooled to about 0° C., which is collected in the well —58—, from which it will be drawn at the proper time in order to be caused to circulate either in the condenser —49— or in the interchanger —59. 60—. The tank —1ᵈ—, from which the icy melting water has already been drawn, is ready to be filled with the solution to be concentrated. This solution before being admitted into —1ᵈ— may be caused to circulate through the interchangers —59. 60— in countercurrent with the cold water at 0° C drawn from the cistern —58—. In this way the temperature of this solution is lowered before pouring it into the tank —1ᵈ—. When the tank —1ᵈ— is filled, it is inserted into the circuit by opening the cocks —10. 13—.

Claims.

1. In an apparatus for concentrating solutions by freezing and separating the soluble matters from the ice crystals, a freezing tank provided with straight tubes arranged longitudinally in the tank in horizontal ranges, and adapted to convey cooling brine through said tanks in opposite directions; means for regulating the circulation of the brine through said tubes; means for introducing brine of the same temperature as the outside air, into said pipes; and means for displacing the soluble matters from the ice crystals between and around said pipes.

2. In an apparatus for concentrating solutions, the combination with the freezing tank; of means for introducing a displacing fluid thereinto, said means comprising a sprinkling reservoir adapted to spray the displacing fluid evenly over the frozen mass within the freezing tank; a traveling crane for movably mounting said reservoir above the tank; means for raising and lowering the reservoir; and means for moving the reservoir from one end to the other of said freezing tank.

3. In an apparatus of the character described, freezing tanks provided with distributing and collecting reservoirs placed at each end of the tanks, said reservoirs being separated one from the other and from the freezing tank by water-tight partitions; a plurality of freezing tubes arranged in horizontal ranges and passing through said partitions in such manner as to form alternate connections between the left feeding compartment and the right waste compartment, and between the right feeding reservoir and the left waste reservoir at the other end of the tank; inlet pipes for said feeding compartments; outlet pipes for said waste compartments; valves for controlling the flow in said inlet and outlet pipes; reservoirs for brine adapted to be successively connected with said inlet pipes; and means for returning the brine from the waste reservoirs to either of said brine reservoirs.

4. In an apparatus of the character described, a freezing tank provided with feeding and waste compartments separated from the main freezing chamber by water-tight walls comprising separable plates provided with notches; and longitudinal pipes arranged in ranges within said freezing chamber and supported by said notched plates.

5. In an apparatus of the character described, the combination with the freezing chamber, and feeding and waste compartments on each end thereof; of a plurality of separable elements adapted to be supported by pipes below and to support pipes above, said elements being provided with notches whereby they are adapted to form a water-tight wall about the pipes.

6. In an apparatus of the character described, which comprises a freezing tank; means for spraying a frozen solution with a displacing solution, said means comprising an overhead traveling crane mounted upon said tank and adapted to travel over its entire length; and a sprayer of the same width as the tank, supported by the traveling crane.

7. In combination with an apparatus of the character described, a spraying apparatus mounted upon said apparatus and comprising a reservoir for the displacing solution, said reservoir being provided with perforated discharge openings; and crank-operated means for controlling the discharge of the solution through said holes.

8. In a plant for the concentration of solutions, the combination with a plurality of freezing tanks and means for freezing solutions therein; of a refrigerator; a reservoir for lukewarm brine; collecting reservoirs; a reservoir for melted ice; interchangers for cooling gas or solutions; a plurality of gas-cooling condensers adapted to be connected in series or in tandem; and a system of valves whereby each of said tanks independently, may be brought into or thrown out of circuit with the other tanks and with various parts of the plant.

The foregoing specification signed at Turin, Kingdom of Italy, this 19th day of February 1907.

EUDO MONTI.

In presence of—
VITALI SALVATORE,
ANGELO KEGATO.